(12) United States Patent
Casden

(10) Patent No.: US 6,828,902 B2
(45) Date of Patent: Dec. 7, 2004

(54) WIRELESS DATA INPUT TO RFID READER

(75) Inventor: Martin S. Casden, Calabasas, CA (US)

(73) Assignee: Soundcraft, Inc., Chatsworth, CA (US)

( * ) Notice: Subject to any disclaimer, the term of this patent is extended or adjusted under 35 U.S.C. 154(b) by 166 days.

(21) Appl. No.: 09/944,646

(22) Filed: Aug. 31, 2001

(65) Prior Publication Data

US 2002/0047777 A1 Apr. 25, 2002

Related U.S. Application Data

(63) Continuation-in-part of application No. 09/212,583, filed on Dec. 14, 1998, now Pat. No. 6,285,295.

(51) Int. Cl.[7] .................................................. H04Q 1/00
(52) U.S. Cl. .................... 340/10.3; 340/10.41; 340/928; 340/825.22; 342/42; 341/32
(58) Field of Search ............................ 340/10.3, 10.41, 340/928, 825.69, 825.72, 825.22; 341/32, 176; 342/42

(56) References Cited

U.S. PATENT DOCUMENTS

| | | | | |
|---|---|---|---|---|
| 3,786,496 A | * | 1/1974 | Verbaas | 341/32 |
| 5,461,385 A | * | 10/1995 | Armstrong | 340/10.41 |
| 5,748,106 A | * | 5/1998 | Schoenian et al. | 340/928 |
| 5,940,007 A | * | 8/1999 | Brinkmeyer et al. | 340/825.69 |
| 6,285,295 B1 | * | 9/2001 | Casden | 340/10.3 |

* cited by examiner

*Primary Examiner*—Brian Zimmerman
(74) *Attorney, Agent, or Firm*—Law Offices of Natan Epstein

(57) ABSTRACT

A wireless data input system has one or more switches on a keypad or the like and a number of individually addressable RFID tags. Each switch operates to enable a corresponding subset of the individually addressable RFID transponder tags, such that a unique permutation of tag codes recognized by a RFID reader identifies actuation of each particular switch or key.

6 Claims, 3 Drawing Sheets

| KEY # | TRNSPNDER A | TRNSPNDER B | TRNSPNDER C |
|---|---|---|---|
| S1 | OFF | OFF | ON |
| S2 | OFF | ON | OFF |
| S3 | OFF | ON | ON |
| S4 | ON | OFF | OFF |
| S5 | ON | OFF | ON |
| S6 | ON | ON | OFF |
| S7 | ON | ON | ON |

Fig. 4

WIRELESS DATA INPUT TO RFID READER

This application is a continuation-in-part application of Ser. No. 09/212,583 filed Dec. 14, 1998, issued as U.S. Pat. No. 6,285,295 on Sep. 4, 2001.

BACKGROUND OF THE INVENTION

1. Field of the Invention

This invention relates generally of the field of radio frequency identification (RFID) systems and devices intended to sense the presence of a transponder tag within a sensing field of a reader unit and to read an identification code unique to each such tag thereby to identify a person or object associated with the tag. More particularly this invention is directed to a passive remote programmer for reprogramming microprocessor controlled induction type RFID readers, and more generally, to wireless data input to RFID readers or devices associated with RFID readers.

2. State of the Prior Art

Radio frequency identification systems have come into widespread usage in a wide range of applications. One such application is controlling access to restricted areas of buildings or plant facilities by authorized personnel while excluding those lacking the necessary authorization. Most such proximity systems consist of a transponder, a reader and a host computer. The reader generates a radio frequency (usually in the 125 kHz or 13.5 MHz range). The transponder usually consists of an antenna circuit (tuned to the same frequency as the output of the reader) and an integrated circuit (IC). Sufficient energy to activate the PC is obtained via induction when the transponder is placed within the field of the reader. The frequency of the reader is also used as a clock for the IC. When energized, the transponder IC loads the antenna circuit of the transponder in a pattern determined by the design and programming of the IC. The loading of the transponder antenna is detected as a pattern of voltage changes on the reader's antenna circuit. The changes are converted into logical data bits using standard decoding methods and the data is then interpreted by the host and appropriate action (such as opening the door) is taken.

The topology of the various systems can range from a stand alone single door unit that contains the reader and the host in one small box mounted adjacent to a passageway to a complex system consisting of thousands of readers and other input/output devices connected to a communications network controlled by hundreds of host computers (running specialize software) that control access, personnel and property movement, lighting, HVAC, fuel dispensing and other functions. In stand alone, single door, products and in some systems with distributed intelligence, the reader and host are often combined into a single entity.

SecuraKey, a division of Soundcraft, Inc., the assignee of this invention sells a reader under the name Radio Key® 600 or RK600, described in their commercial literature as a "stand alone proximity/keypad access control system" which has a built-in programmer. This reader is of the inductive type and is intended to function in conjunction with key tags, also sold by the same assignee, which are passive bi-directional transponders in that power for the key tag is derived from the electromagnetic field generated by the reader. Each transponder consists of an integrated circuit and an antenna coil, both embedded in a small plastic token or tag. The integrated circuit of the transponder tag is a TEMIC e5550 contactless R/W-Identification IC (IDIC®) device sold by the semiconductor division of TEMIC TELEFUNKEN microelectronic GmbH, P.O.B. 3535, D-74025 Heilbronn, Germany.

There is a need for periodically reprogramming such proximity systems as authorized personnel and access control requirements change. For example, as newly authorized individuals are issued transponder tags, the new tags must be entered into the reader's programmed data base in order to be recognized when presented to the reader. Likewise, tags need to be removed from the data base as personnel leaves or is reassigned. In large RFID systems such reprogramming is typically done through the host computer linked to multiple readers. In smaller systems or those lacking centralized control, reprogramming may need to be done at each reader. Conventionally, this may be achieved through a keyboard provided on the reader unit itself, as in the aforementioned RK600 reader. It is often desirable to provide means for remotely programming the reader for convenience or security reasons. Radio frequency linked hand held remote programmers are available for this purpose. Such units typically include a keyboard connected to a microprocessor which delivers programming data transmitted via a low power radio frequency carrier generated by the programmer unit. Also available are passive programmers which draw their operating power from the electromagnetic field emitted by the reader. Existing passive programmers, however, are microprocessor based and of considerable complexity. Also, the power requirements of these existing units is relatively large which results in a rather short operating range because the programmer must be brought sufficiently close to the reader where the field strength is adequate for powering the programmer. A continuing need exists for simpler, lower cost passive programmers, particularly for use with small or stand alone RFID installations.

More recently, RFID transponder tags have become available which are individually addressable by the RFID reader. That is, the tag does not automatically respond with its tag code when in the induction field of the RFID reader until it is specifically addressed or interrogated by the reader with that tag's unique tag identification code. This allows reading of multiple tags simultaneously present in the reader's radio frequency induction field. Exemplary of such tags are the I_CODE series of RFID tags sold by Philips Electronics, and the M35101 Contacless Memory Chip sodl by ST. Suitable RFID readers capable of reading multiple transponders simultaneously present in its induction field include theET-WS and ET-RS high frequency proximity readers sold by Secura Key, a Division of Soundcraft Inc. The RFID reader is preprogrammed with the unique identification code of each tag in the tag group or population to be read, and the reader executes a read scan or sequence during which it sequentially transmits, by modulating its induction field, the preprogrammed unique tag identification codes. The reader cycles through this read scan or sequence at a relatively high repetition rate sufficient to reasonable ensure that the presence of any one of the tags in the reader's sensing field does not go undetected.

SUMMARY OF THE INVENTION

This invention addresses the aforementioned need by providing a simpler passive remote programmer for induction type RFID readers. The novel remote programmer is of economical design, requiring only three main components: a keypad, an antenna and a number of commercially available, low cost transponder tags. Each of the transponder tags, when connected to the antenna by actuation of a key on the keypad, communicates with the RFID reader by loading down the magnetic field in the vicinity of the transmitter antenna of the reader in a pattern which the reader interprets and decodes as digital data.

More specifically, the passive remote programmer system of this invention is intended for use with an induction type RFID reader having radio frequency (RF) sensing means operatively connected to a digital processor, such as a microprocessor, for reading tag identification data of RFID transponder tags powered by a sensing field of the reader and for verifying the identification data against stored identification data thereby to recognize the presence of authorized tags.

The programmer which may be a hand held unit houses an antenna, such as a loop antenna, a number of dedicated RFID transponder tags each having a unique tag code, and a keyboard having a plurality of keys each selectively operable for connecting a corresponding one of the dedicated RFID transponder tags to the antenna thereby to inductively power the selected tag in the reader's sensing field and enable the unique tag code of the selected tag to be read by the said RFID reader. The remote programmer operates in conjunction with programming of the reader's microprocessor for recognizing the unique tag codes of the dedicated tags as new reader programming instructions. In most cases the reader program is also operative for retaining or storing in microprocessor memory the new program instructions for subsequent execution by the microprocessor. The new program instructions may, for example, comprise data for modifying a transponder tag data base accessible to the reader microprocessor for use in executing decision making algorithms such as granting or denying access upon reading a particular tag code.

In a broader sense, the present invention may be understood as a method for wireless linkage of a keypad to an induction type RFID reader, comprising the steps of providing a keyboard having one or more individually actuatable normally open switch keys, connecting each of the switch keys to a corresponding RFID transponder tag and an antenna such that closing a particular switch key places a corresponding transponder tag in operative connection with the antenna for inductively communicating a unique identification code of the tag to the RFID reader; and program means executable by a microprocessor in the RFID reader for recognizing the unique identification code of each tag connected to the keyboard thereby to recognize the reading of those tags as representing the actuation of a key or switch rather than the conventional presentation of a proximity key tag to the reader. The reading of the unique identification code may be interpreted as a new program instruction for the microprocessor modifying existing programming, but in general elicits a response from the reader which is different from the response elicited by the reading of a conventionally presented access key tag.

Another aspect of the invention relates to a method for wireless linkage of a keypad to an induction type RFID reader comprising the steps of providing a keypad having a plurality of manually operable switch keys; providing a plurality of individually addressable RFID transponder tags; connecting each of the switch keys to a plurality of the RFID transponder tags and to an antenna such that actuating each of the switch keys places a corresponding permutation of the transponder tags in operative connection with the antenna for inductively transmitting a unique set of tag identification codes of the tags to the RFID reader; and program instructions executable by a microprocessor system in the RFID reader for recognizing the unique set of tag identification codes as representative of actuation of a particular key on the keypad.

The RFID reader may responds to recognition of the aforementioned key actuation by executing preprogrammed instructions of any appropriate type, such as generation of ASCII characters to simulate keyboard data input, for example, which data input may be communicated to other devices or systems, such as a computer system, by the RFID reader for further processing.

The invention also contemplates an RFID system comprising an RFID reader having RF sensing means operatively connected to a microprocessor for interrogating a population of individually addressable RFID tags; and a remote data input unit comprising an antenna, a plurality of individually addressable RFID transponder tags each having a unique tag code, and one or more switches, each of the switches being operable for connecting a corresponding permutation of the RFID transponder tags to the antenna thereby to power the corresponding permutation of tags in a radio frequency field of the reader to enable reading by the RFID reader of a unique set of tag codes corresponding to the permutation of tags. In particular each of the may be a manually operable switch key on a keypad and the data input unit may have a portable housing containing the antenna, the individually addressable RFID transponder tags, and the switches which may be mounted on the housing The invention is also directed to a wireless keyboard having a plurality of switch keys, each key operable for enabling a corresponding set of individually addressable RFID transponder tags in an induction field of an RFID reader, each set of tags constituting a unique combination of tag codes, such that the RFID reader can be programmed to recognize actuation of particular ones of the switch keys thereby to receive data input from the keyboard.

These and other features, improvements and advantages of the present invention will be better appreciated and understood by reference to the following detailed description taken in conjunction with the accompanying drawings.

BRIEF DESCRIPTION OF THE DRAWINGS

FIG. 4 is a table showing exemplary tag permutations in a data input unit such as a keypad or keyboard having seven switch keys and three individually addressable RFID transponder tags.

DETAILED DESCRIPTION OF THE PREFERRED EMBODIMENTS

Figure 1:
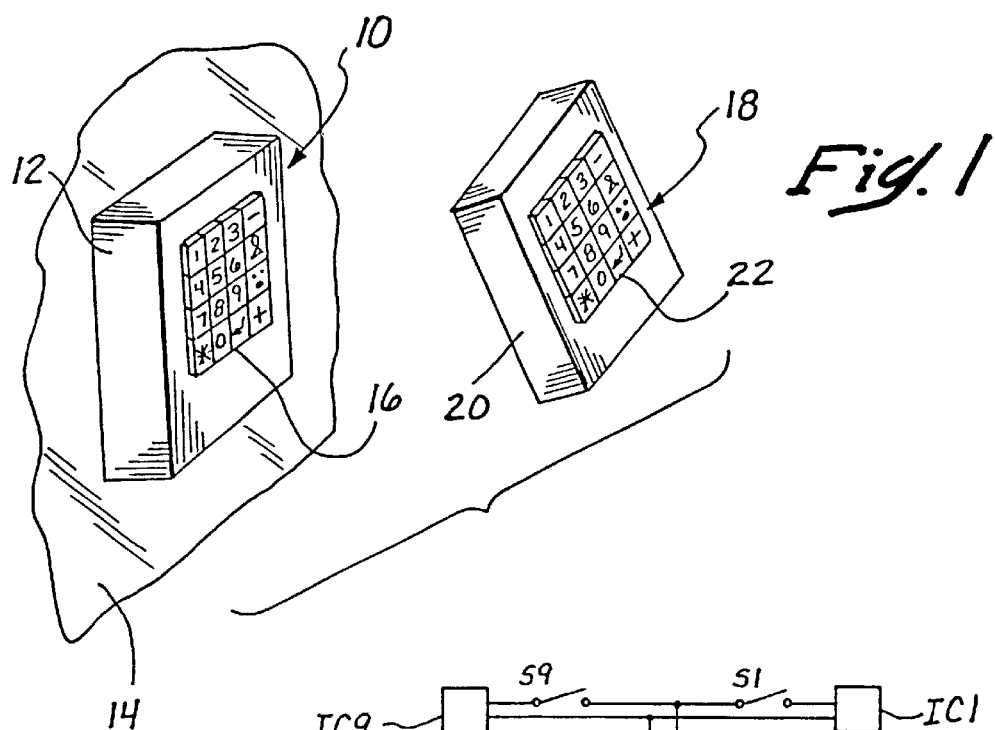
FIG. 1 is a perspective view illustrating a typical wall mounted RFID reader equipped with a keypad and a remote programmer according to this invention packaged as a hand held unit.

With reference to the accompanying drawings wherein similar elements are designated by similar numerals. FIG. 1 depicts a typical proximity RFID reader unit 10 contained in a reader housing 12 which is mounted on a wall surface 14. For purposes of this description the reader 10 may be an RK600 sold by SecuraKey equipped with an exteriorly mounted keypad 16 which provides an interface for accessing the reader's microprocessor control system. In most installations such access requires entry of an authorized passcode before the keyboard is enabled for reprogramming the reader unit. The keypad may also be used for entering a personal identification number (PIN) as an alternative to presentation of a key tag.

A passive remote programmer 18 according to this invention is shown having a housing 20 on which is mounted a keypad 22. The housing 20 may be a small enclosure sized for convenient hand held operation. The remote programmer's keypad may be a duplicate of the reader keypad 16, or may be configured differently.

Figure 2:
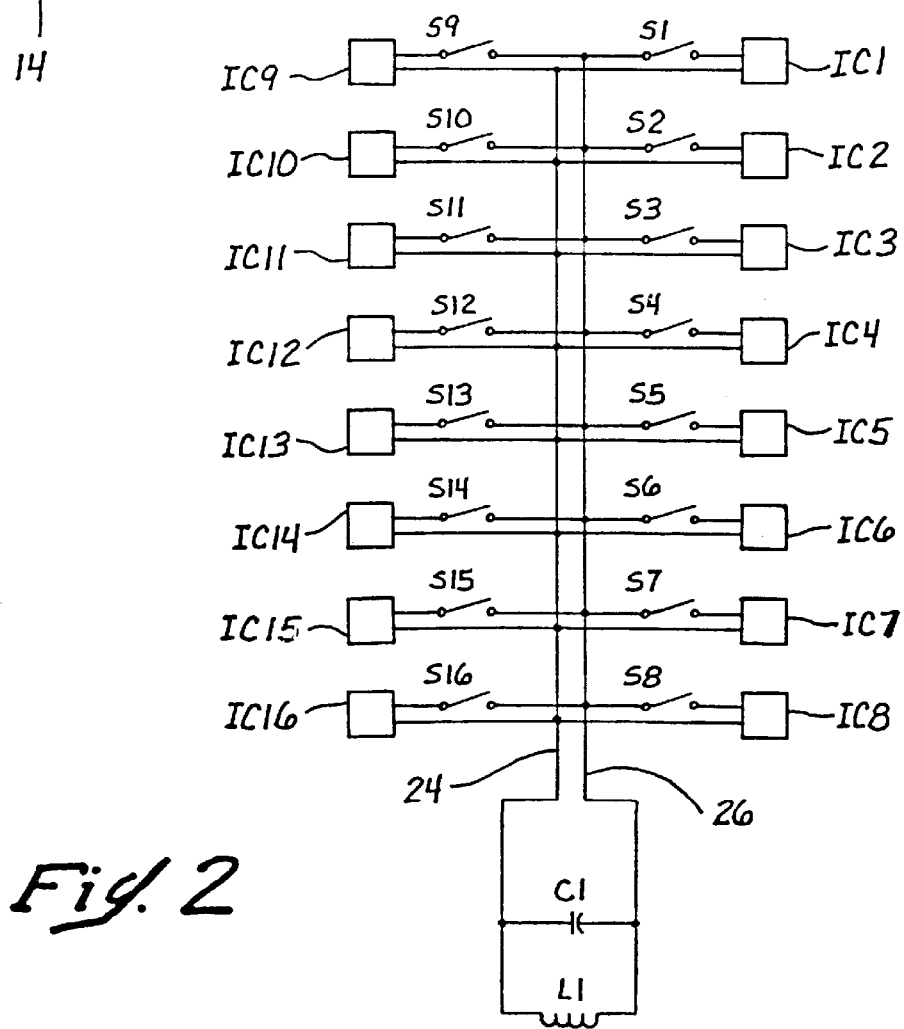
FIG. 2 is a circuit diagram of the novel remote programmer.

Turn now to FIG. 2 which shows a circuit diagram of the passive remote programmer 18. It will be appreciated that this circuit is quite simple and with few components. Switches S1 through S16 are normally open switches corresponding to sixteen keys arranged in a four-by-four matrix on the keypad 22. Integrated circuits IC1 through IC16 are sixteen similar transponder tags each programmed to transmit a unique identification code when activated by the inductive sensing field of a proximity reader. The transponder IC's may be TEMIC e5550 devices which operate with the RK600 reader. Antenna coil L1 and capacitor C1 form an antenna tank circuit which is resonant at the transmitter frequency of the proximity reader. For example, L1 may be a 1.62 mH coil and C1 may have a value of 1000 pF. Each tag IC has two active terminals, one of which is connected directly to one side of the antenna tank circuit by means of bus line 24. The other active terminal of each tag IC is connected through a corresponding normally open switch S1–S16 to the other side of the antenna tank circuit by means of bus line 26. In a normal condition of the programmer all switches S1–S16 are open and none of IC1–IC16 are connected to the antenna circuit. Consequently, if the remote programmer unit 18 is placed in this condition within the sensing field of the reader unit 10, the programmer unit will not respond to the reader's sensing field. If, however any one of the keys on the keypad is pressed, closing one of switches S1–S16, the corresponding one of IC1–IC16 will have both of its active terminals operatively connected across the antenna tank circuit. In this condition, the operative IC will be powered up by energy inductively coupled from the reader to the antenna coil L1, and will transmit its unique tag code to the reader. The transponder IC may be in the form of surface mount dies and the entire circuit of FIG. 2 can be easily implemented on a single circuit board which can also carry the keypad and antenna coil. The resulting package is lightweight and rugged. The passive programmer disclosed herein improves over prior passive programmers not only in terms of greater simplicity and economy, but also in extended operating range from the proximity reader because the transponder tags have lower power requirements than a microprocessor based passive programmer.

The program executed by the reader's microprocessor is written to recognize the unique tag codes of the programmer's transponder tags IC1–IC16 as dedicated to a function other than ordinary access key tag data. In particular, the reader's program should recognize the reading of the dedicated tag codes as representing the actuation of a key rather than the presentation of a conventional key tag to the proximity reader. This recognition may be exploited by the programmer of the reader for any desired purpose. For example, keys corresponding to the digits 0 through 9 may each be represented by a particular and unique tag code, so that numerical data may be entered into the reader by pressing a sequence of keys. Logic function keys such as ADD or DELETE may be similarly represented by corresponding unique tag codes. Still other control functions, such as an ENTER key on the keyboard, may also be assigned corresponding tag codes. For example, the remote programmer may be used to add to or delete authorized key tags in the reader's data base, as by pressing a sequence of digits followed by pressing an ENTER key, or to enter PIN codes into the reader as an alternative to using the keypad 16 on the reader unit 10. In fact, the remote programmer can replace altogether the keypad on the reader with no sacrifice in programmability of the reader, resulting in a more secure installation since the keypad is no longer accessible on the reader. Also, elimination of the keypad makes it possible to better seal the reader enclosure or housing for better weather proofing and resistance to environmental contaminants.

The manner of programming the reader's microprocessor to accomplish such recognition will be apparent to those having ordinary knowledge of such systems and need not be described in greater detail here, particularly in view of the many ways in which proximity reader systems can be programmed both for conventional purposes and for purposes of implementing this invention. The programming which controls operation of the reader's microprocessor may be installed as firmware in non-volatile memory provided on the processor chip. Of course, other program storage devices may be provided for this purpose. For purposes of this invention, the reader control program should contain information to enable the reader to identify the unique ID code transmitted by the transponder tags in the remote programmer so that these are distinguishable from other transponder tags not enabled by actuation of a key or switch, such as conventional key tags. This information is distinct from the data base which the microprocessor accesses in order to identify conventional key tags authorized for access. Recognition of key enabled transponder tags permits programming of the reader to take special action in response to such tags, different from action taken in response to conventional tags which are enabled simply by sufficient proximity to the reader.

The number and functions of keypad keys which can be encoded and wirelessly linked to a reader in this fashion is virtually unlimited. As a practical matter, however, it may be found that this approach to passive remote programming is best suited to smaller keypads, while programmer units requiring large and complex keyboards are better implemented with microprocessor driven circuits.

It should be understood that this invention is not restricted to any particular manufacturer's proximity systems, and is generally useful with any induction type proximity readers, provided that the tag ICs used in the remote programmer unit can be read by the target proximity reader.

The wireless data entry system described above works well when the number of keys or switches is relatively small. As the number of keys required in a particular application grows, so does the number of transponder tags. At some point, it becomes simpler to build a dedicated, standard electronic circuit for that application. This limitation is addressed by the wireless data entry of FIGS. 3 and 4 as explained below.

Figure 3:
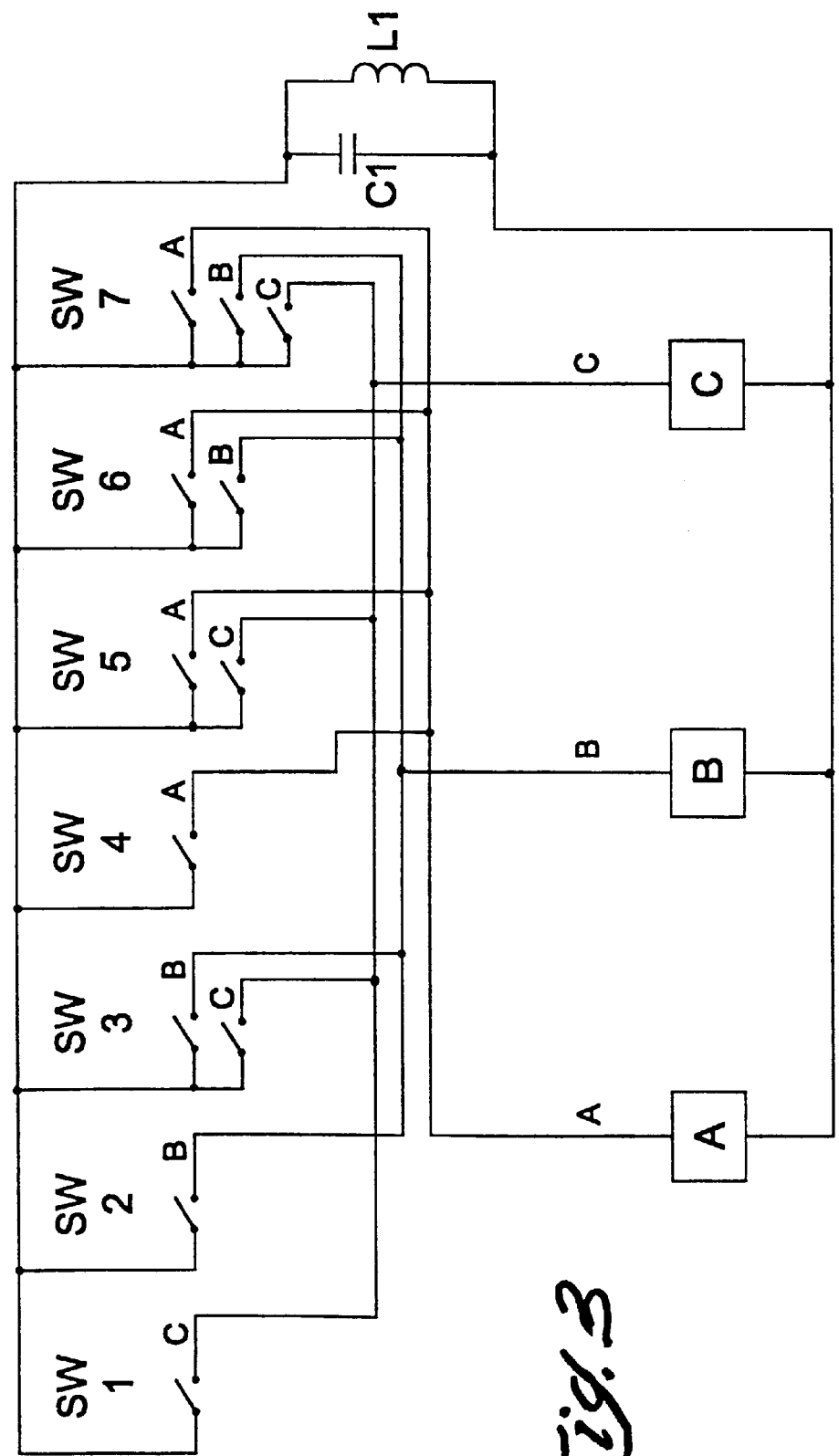
FIG. 3 is a circuit diagram of a wireless data input system according to this invention.

FIGS. 3 and 4 of the drawings depict a system and method for wireless data entry to an RFID reader. The system shown has seven switch keys designated S1 through S7 in the drawings, and three individually addressable RFID transponder tags designated by the letters A, B and C. As shown in FIG. 3, each of the seven switches S1–S7 is connected to one or more of a group of three individually addressable RFID transponder tags A, B and C, and also to an antenna which in the illustrated example consists of coil L1 and capacitor C1 connected to form a circuit tuned to the frequency of the RFID reader's radio frequency induction field. The connections in the circuit of FIG. 3 are such as to implement the logic table of FIG. 4. That is, actuation of switch S1 electrically connects individually addressable transponder C to the antenna circuit L1-C1, thereby enabling transponder C which can then be turned on when individually addressed or interrogated by the RFID reader. However, actuation of switch S1 does not enable transponders A and B which cannot be addressed by the RFID reader. Actuation of switch S6, on the other hand, enables transponders A and B but not transponder C. With switch S6 closed, both transponders A and B are able to receive the interrogation signal of the RFID reader transmitted sequentially during the read cycle of the RFID reader, and can respond to such interrogation by returning each transponder' unique tag identification codes. The RFID reader, upon receiving the unique codes of transponders A and B is able to interpret this combination of tag codes as representing actuation of switch S5 by means of appropriate preprogramming of the reader's microprocessor. As shown in the Table of FIG. 4 each switch S1–S7 has a corresponding permutation of transponders A,B,C which results in a unique combination of tag codes associated with each of the switches.

It will be appreciated that data input from seven switch keys is possible in this example using only three individually addressable RFID transponder tags. That is, there is no longer a one-to-one correspondence between each switch and one corresponding tag. Rather, each switch is associated with a unique set of one or more transponder tags, so that different permutations of a smaller group of tags can be assigned to each of the switches. The switches S1–S7 may be in the form of a keypad or keyboard 22 mounted on a portable housing 20 such as shown in FIG. 1, with the transponder tags A–C contained in the housing on a suitable circuit board.

Expanding on the example of FIGS. 3 and 4, a complete QWERTY type computer keyboard may be constructed which has no integral power source and would require 8 to 10 transponder tags, one or more antenna coils (depending on loading considerations) and a keyboard that connects the appropriate transponders via a circuit board for each key.

While particular embodiments of the invention have been described and illustrated for purposes of clarity and example, many changes, substitutions and modifications to the described embodiments will be apparent to those having ordinary skill in this technology without thereby departing from the scope of this invention as defined by the following claims.

What is claimed is:

1. A method for wireless linkage of a keypad to an induction type RFID reader comprising the steps of:

providing a keypad having a plurality of manually operable switch keys;

providing a plurality of individually addressable RFID transponder tags;

connecting each of said switch keys to a plurality of said RFID transponder tag and an antenna such that actuating each of said switch keys places a corresponding permutation of said transponder tags in operative connection with said antenna for inductively transmitting a unique set of tag identification codes of said tags to the RFID reader; and program means executable by microprocessor means in the RFID for recognizing said unique set of tag identification codes as representative of actuation of a particular key on said keypad.

2. The method of claim 1 wherein said further comprising the step of executing program means by the reader associated with actuation of said particular key.

3. An RFID system comprising:

an RFID reader having RF sensing means operatively connected to a microprocessor for interrogating a population of individually addressable RFID tags; and a remote data input unit comprising an antenna, a plurality of individually addressable RFID transponder tags each having a unique tag code, and one or more switches, each of said one or more switches operable for connecting a corresponding permutation of said RFID transponder tags to said antenna thereby to power said corresponding permutation in a radio frequency field of said reader to enable reading by the said RFID reader of a unique set of tag codes corresponding to said permutation of tags.

4. The RFID system of claim 3 wherein each of said one or more switches is a manually operable switch key on a keypad.

5. The RFID reader system of claim 3 wherein said data input unit comprises a portable housing containing said antenna and said individually addressable RFID transponder tags, and said one or more switches is mounted on said housing.

6. A wireless keyboard having a plurality of switch keys, each key operable for enabling a corresponding set of individually addressable RFID transponder tags in an induction field of an RFID reader, each said set comprising a unique combination of tag codes, such that said RFID reader can be programmed to recognize actuation of particular ones of said switch keys thereby to receive data input from said keyboard.

* * * * *